United States Patent [19]

Yamamoto

[11] Patent Number: 5,235,648
[45] Date of Patent: Aug. 10, 1993

[54] VOLUME CONTROL DEVICE MOUNTING MECHANISM FOR ON-VEHICLE EQUIPMENT

[75] Inventor: Satoru Yamamoto, Hyogo, Japan

[73] Assignee: Mitsubishi Denki Kabushiki Kaisha, Tokyo, Japan

[21] Appl. No.: 748,805

[22] Filed: Aug. 22, 1991

[30] Foreign Application Priority Data

Oct. 22, 1990 [JP] Japan .................. 2-110815[U]

[51] Int. Cl.$^5$ .............................................. H03G 3/02
[52] U.S. Cl. ................................. 381/109; 248/548; 455/177.1
[58] Field of Search ............... 248/548, 900; 455/177.1; 381/109

[56] References Cited

U.S. PATENT DOCUMENTS

| | | | |
|---|---|---|---|
| 2,916,617 | 12/1959 | Mladek | 455/177.1 |
| 3,951,001 | 4/1976 | Saito et al. | 74/10 R |
| 4,449,955 | 5/1984 | Watanabe et al. | 74/10 R |

FOREIGN PATENT DOCUMENTS

| | | |
|---|---|---|
| 57-184299 | 11/1982 | Japan . |
| 60-16594 | 2/1985 | Japan . |
| 63-155601 | 10/1988 | Japan . |

*Primary Examiner*—Jin F. Ng
*Assistant Examiner*—Edward Lefkowitz

[57] ABSTRACT

A volume control device mounting mechanism for on-vehicle equipment comprising: a variable resistor having a shaft; a knob mounted to an end of the shaft; a chassis for securing the shaft; a insertion hole formed on the chassis, the shaft being inserted through the hole; and slits formed on the chassis around the insertion hole, whereby mechanical strength of the chassis around the shaft insertion hole is slightly decreased from that of other portion of the chassis. The slits provided on the chassis prevent the volume control knob and the shaft from destruction due to large impact force, thereby the variable resistor as well as the knob and the shaft can be reused and human body of car-driver can be protected from injury.

4 Claims, 3 Drawing Sheets

VOLUME CONTROL DEVICE MOUNTING MECHANISM FOR ON-VEHICLE EQUIPMENT

BACKGROUND OF THE INVENTION

1. Field of the Invention

The present invention relates to a volume control device mounting mechanism for various equipment mounted on a vehicle.

2. Description of the Prior Art

FIG. 5 is a configuration of the conventional volume control device mounting mechanism for on-vehicle equipment. In the figure, element 1 is a variable resistor for controlling volume of on-vehicle equipment element 2 is a shaft of the variable resistor 1, element 3 is a volume control knob connected to an end of the shaft, and element 4 is a chassis. Through a insertion hole 5 on the chassis 4 illustrated in FIG. 6, the shaft 2 is inserted and is supported by the chassis 4 with nuts 6 arranged to a threaded portion 2a at the middle of the shaft 2. Element 7 is a base plate for mounting the variable resistor and element 8 is a panel for the on-vehicle equipment.

The conventional volume control device mounting mechanism as described above adopts a method in which the shaft 2 of the variable resistor is secured to the chassis with the nuts 6. Therefore, in order to stably fix the variable resistor, the shaft 2 is secured to the chassis with large force.

Since the conventional volume control device mounting mechanism has the configuration described above, when the volume control knob 3 receives an impact force, the impact force within a certain range may be absorbed by the chassis 4, resulting in no damage to the knob 3 and the shaft 2. However, when the impact force exceeds a certain limit, the impact force may not be absorbed by the chassis 4, which may cause destruction of the knob 3 and the shaft 2.

SUMMARY OF THE INVENTION

The present invention overcomes the above-mentioned drawback. An object of the present invention is to provide a volume control device mounting mechanism of on-vehicle equipment where even an impact force on the volume control knob whose magnitude is beyond a certain limit does not destroy the volume control knob and shaft.

According to the present invention, a volume control device mounting mechanism comprises: a variable resistor having a shaft; a knob mounted to an end of the shaft; a chassis for securing the shaft; an insertion hole formed on the chassis, the shaft being inserted through the hole; and slits formed on the chassis around the insertion hole, whereby mechanical strength of the chassis around the shaft insertion hole is slightly decreased than that of other portion of the chassis.

In the present invention, when an impact force on the knob whose magnitude is beyond a certain limit is exerted on the knob, the impact force is transmitted to the chassis around the shaft insertion hole via the shaft and is absorbed by the deformation of the chassis, thereby the knob and the shaft are protected from destruction.

BRIEF DESCRIPTION OF THE DRAWINGS

The foregoing object and advantages will be better understood from the following description with reference to the accompanying drawings, in which.

DETAILED DESCRIPTION OF PREFERRED EMBODIMENTS

Figure 1:
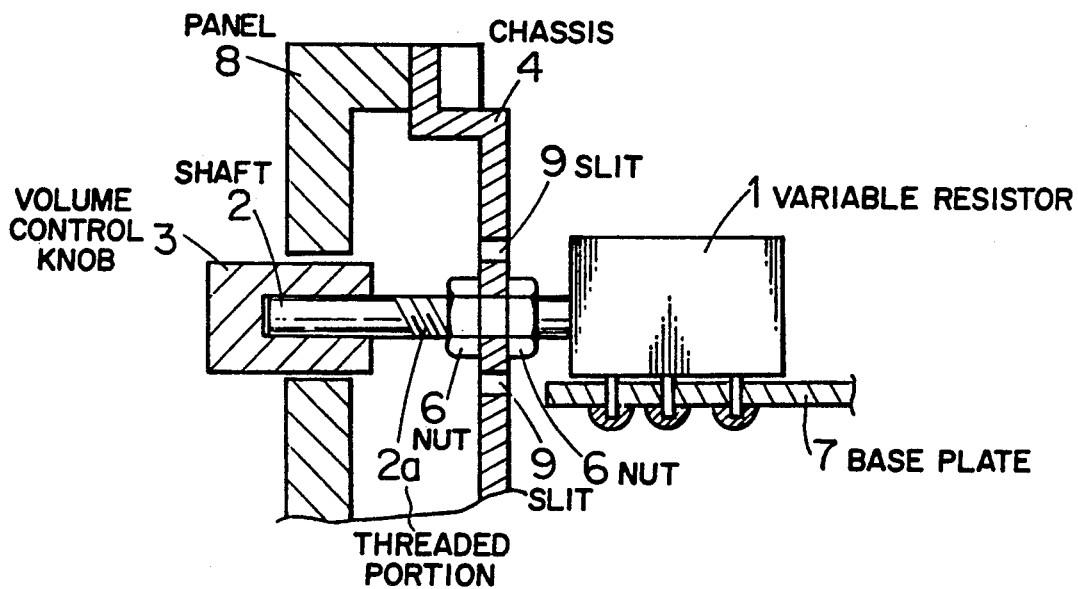
FIG. 1 shows a configuration of the volume control device mounting mechanism for on-vehicle apparatus according to a preferred embodiment of the present invention.
Figure 2:
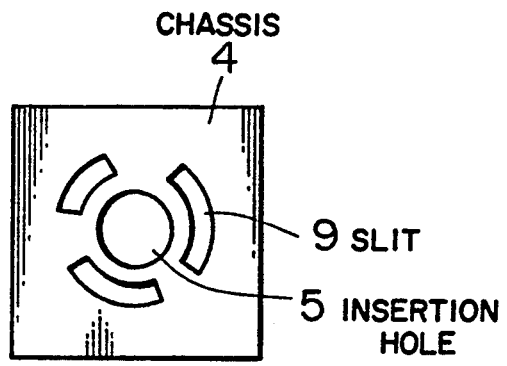
FIG. 2 is an elevational view of a chassis around the shaft insertion hole according to the embodiment of the present invention.
Figure 5:
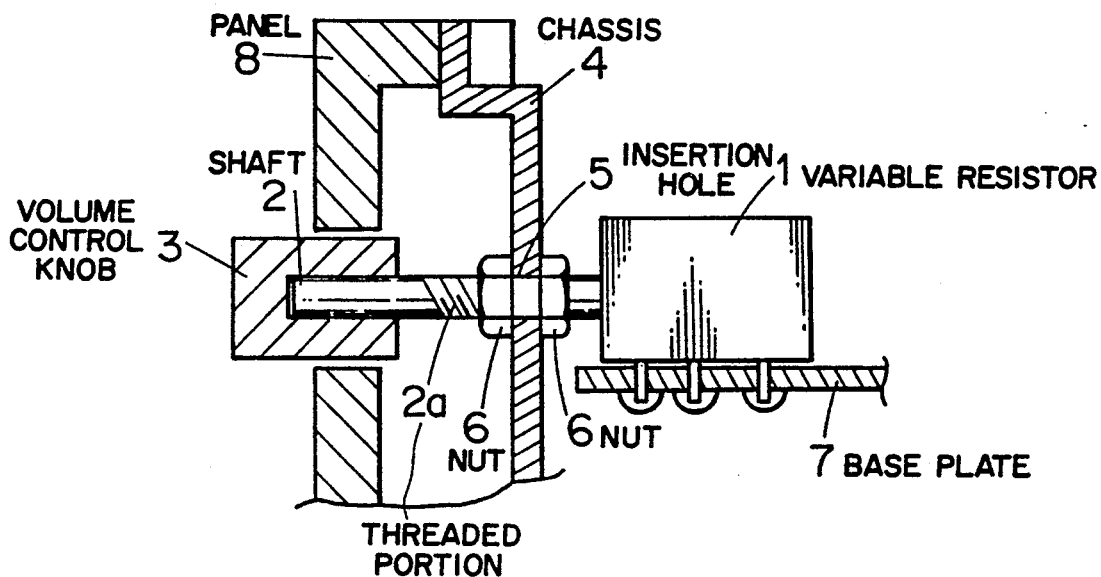
FIG. 5 shows a configuration of the conventional volume control device mounting mechanism.
Figure 6:
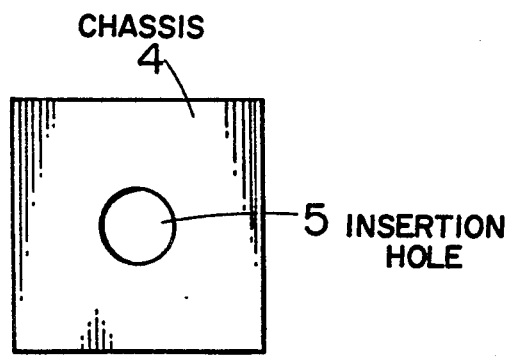
FIG. 6 is a chassis around the shaft insertion hole conventionally used for on-vehicle equipment.

A preferred embodiment of the present invention will now be described with reference to the drawings. FIG. 1 shows a configuration of the volume control device mounting mechanism according to one embodiment of the present invention. Reference numerals 1 to 8 in the figure describe the same elements as those of the conventional volume control device mounting mechanism shown in FIG. 5 and overlapping explanation is omitted. In the figure, element 9 shows three slits concentrically formed around the shaft insertion hole 5 on the chassis 4 as further illustrated in FIG. 2. The mechanical strength of the chassis 4 around the shaft insertion hole 5 is slightly decreased by the slits 9. The chassis 4 around the shaft insertion hole 5 has a certain strength which prevents the chassis from deformation which is caused by pressure and impact force generated in the operation of the volume control knob 3.

Figure 3:
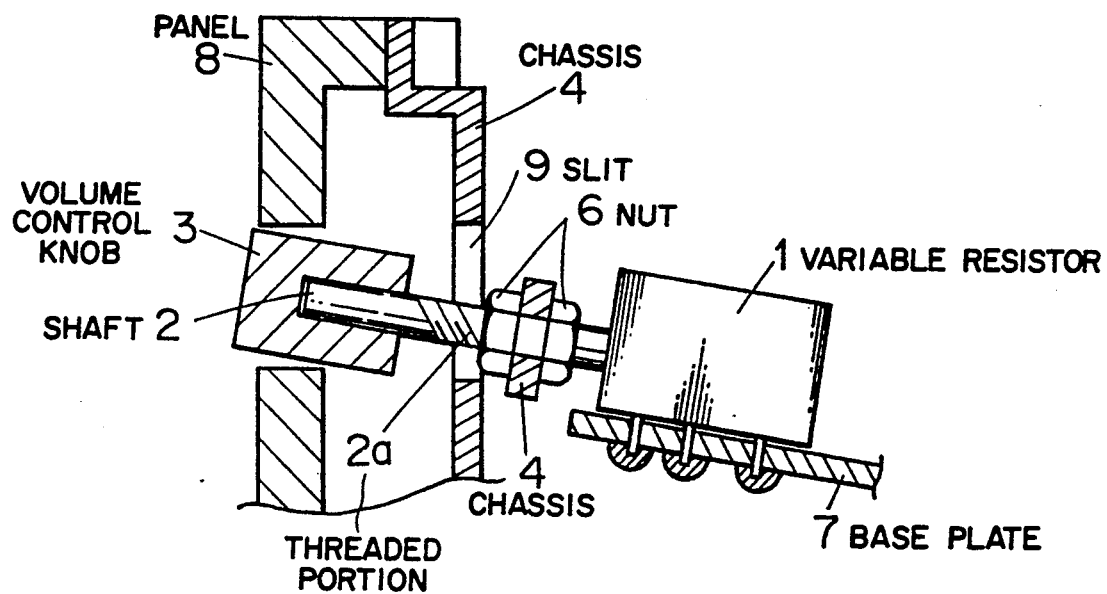
FIG. 3 is an operational drawing of the volume control device mounting mechanism described in FIG. 1.

In the volume control device mounting mechanism according to the present invention as described above, when impact force larger than a certain limit is exerted on the volume control knob 3, which protrudes from the panel 8, the impact force is transmitted to the chassis 4 via the shaft 2. As a result, connecting portions of the slits 9 which are formed on the chassis 4 around the shaft insertion hole 5 are broken or deformed and the variable resistor 1 together with the volume control knob 3 and the shaft 2 is pushed toward the panel 8, as shown in FIG. 3, to prevent destruction of the knob 3 and shaft 2.

Figure 4:
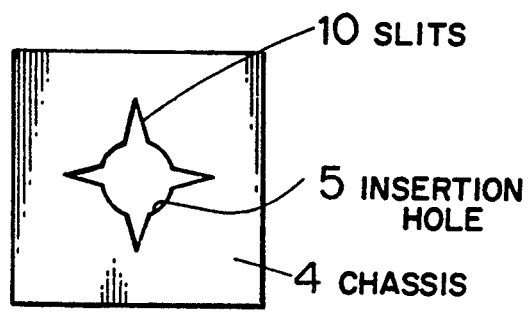
FIG. 4 is an elevational view of a chassis around the shaft insertion hole according to another embodiment of the present invention.

In the embodiment as exemplified above, the slits 9 are concentrically formed as a means for decreasing mechanical strength of the chassis around the shaft insertion hole 5. However, the same effect may be obtained when a plurality of wedge-shaped slits 10 are radially formed on the chassis around the shaft insertion hole 5, as shown in FIG. 4.

To summarize, the volume control device mounting mechanism for on-vehicle equipment according to the present invention is provided with slits on the chassis around the shaft insertion hole to slightly decrease the mechanical strength of chassis around the shaft mounting portion, thereby impact force exerted on the knob can be absorbed through breakage or deformation of the chassis. As a result, the knob and the shaft are prevented from destruction. Further, even if the impact force exerted on the knob is caused by a human such as the car driver, the human will not be injured. Further, prevention of the knob and the shaft from destruction makes it possible to reuse the variable resistor as well as the knob and the shaft.

What is claimed is:

1. A volume control device mounting mechanism for on-vehicle equipment comprising:
   a variable resistor including a shaft;
   a knob mounted to an end of the shaft; and
   a chassis for securing the shaft including,
   an insertion hole formed on the chassis, the shaft being inserted through the insertion hole, and
   a break away portion, formed around the insertion hole, wherein a mechanical strength of the break away portion is lower than the mechanical strength of the remaining portion of the chassis.

2. The volume control device mounting mechanism for on-vehicle equipment of claim 1, wherein the break away portion includes a plurality of slits.

3. The volume control device mounting mechanism for on-vehicle equipment of claim 2, wherein the plurality of slits are wedge-shaped slits radially formed around the insertion hole.

4. The volume control device mounting mechanism for on-vehicle equipment of claim 2, wherein the plurality of slits are concentrically formed around the insertion hole.

* * * * *